July 28, 1931. A. KLIMIS 1,816,290
AUTOMATIC PHOTOGRAPHIC APPARATUS
Filed April 27, 1928 7 Sheets-Sheet 1
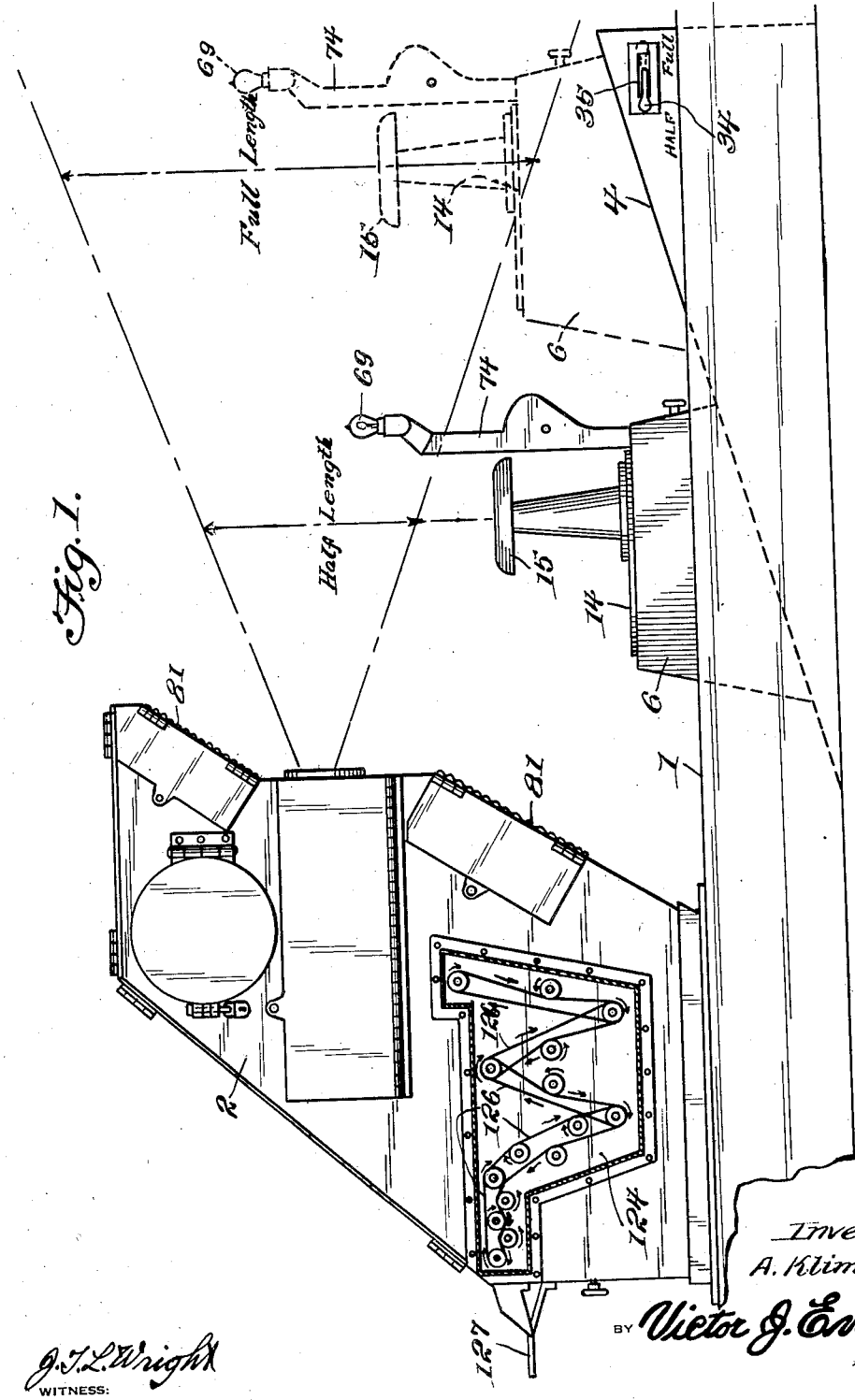

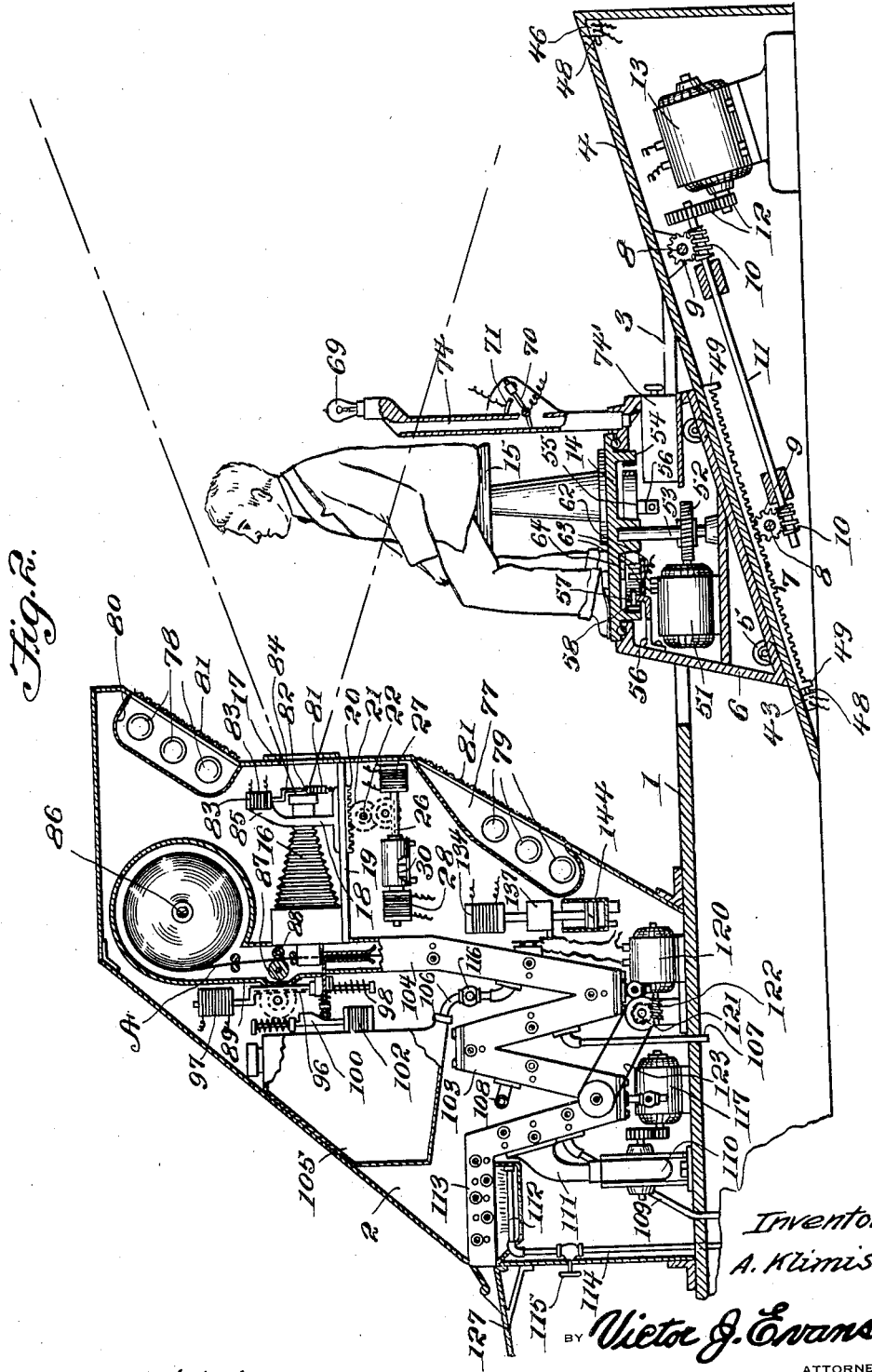

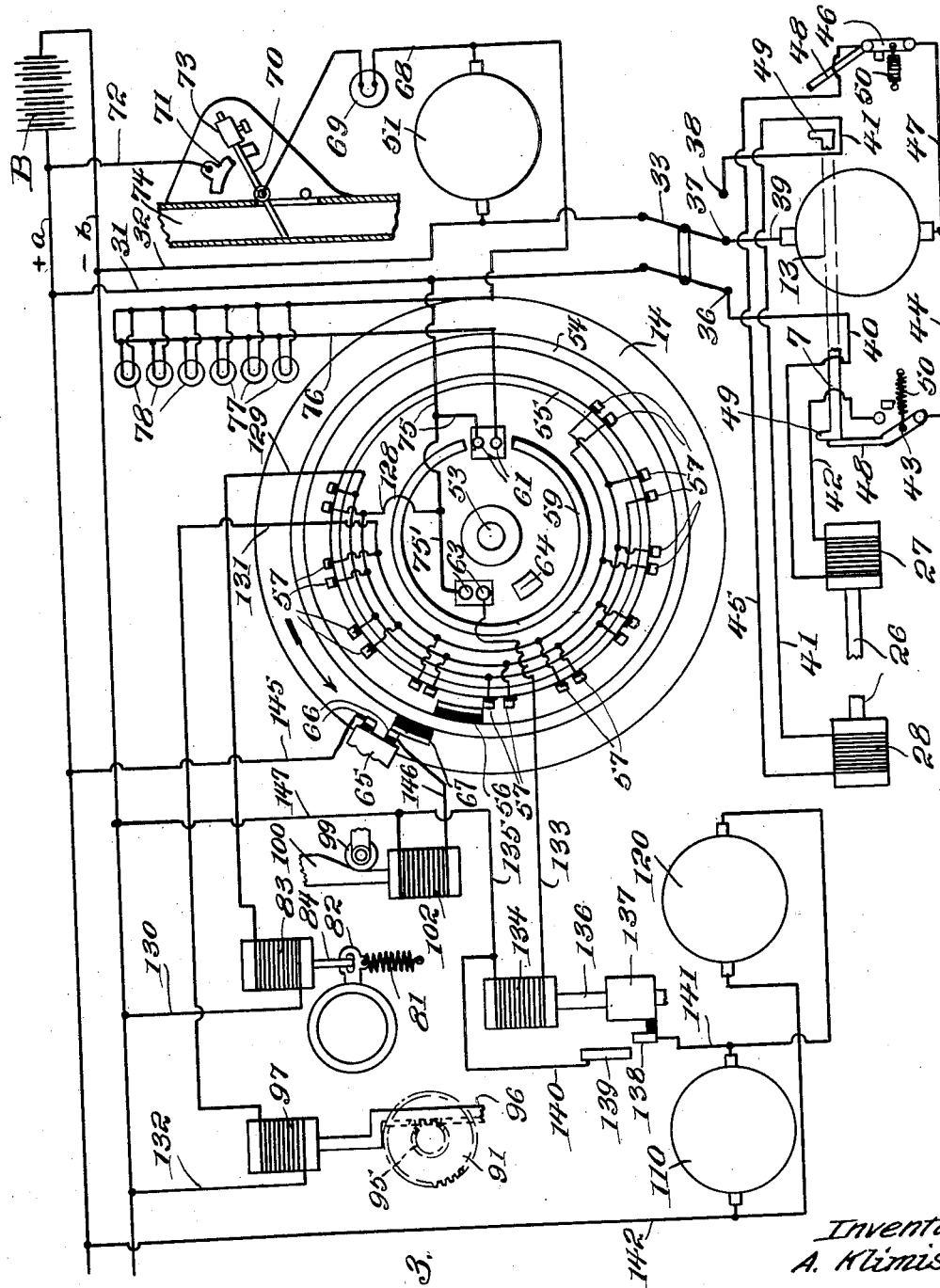

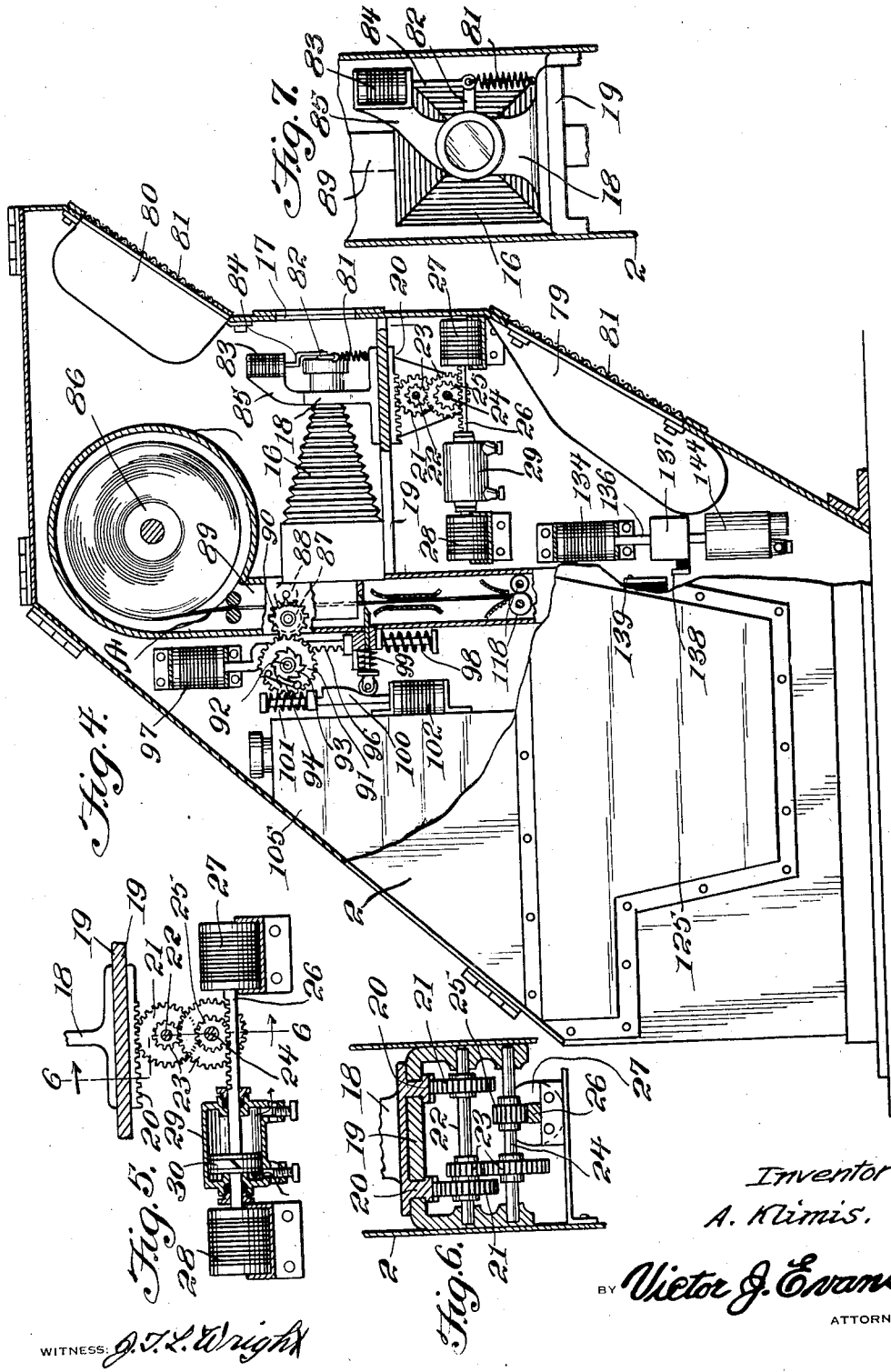

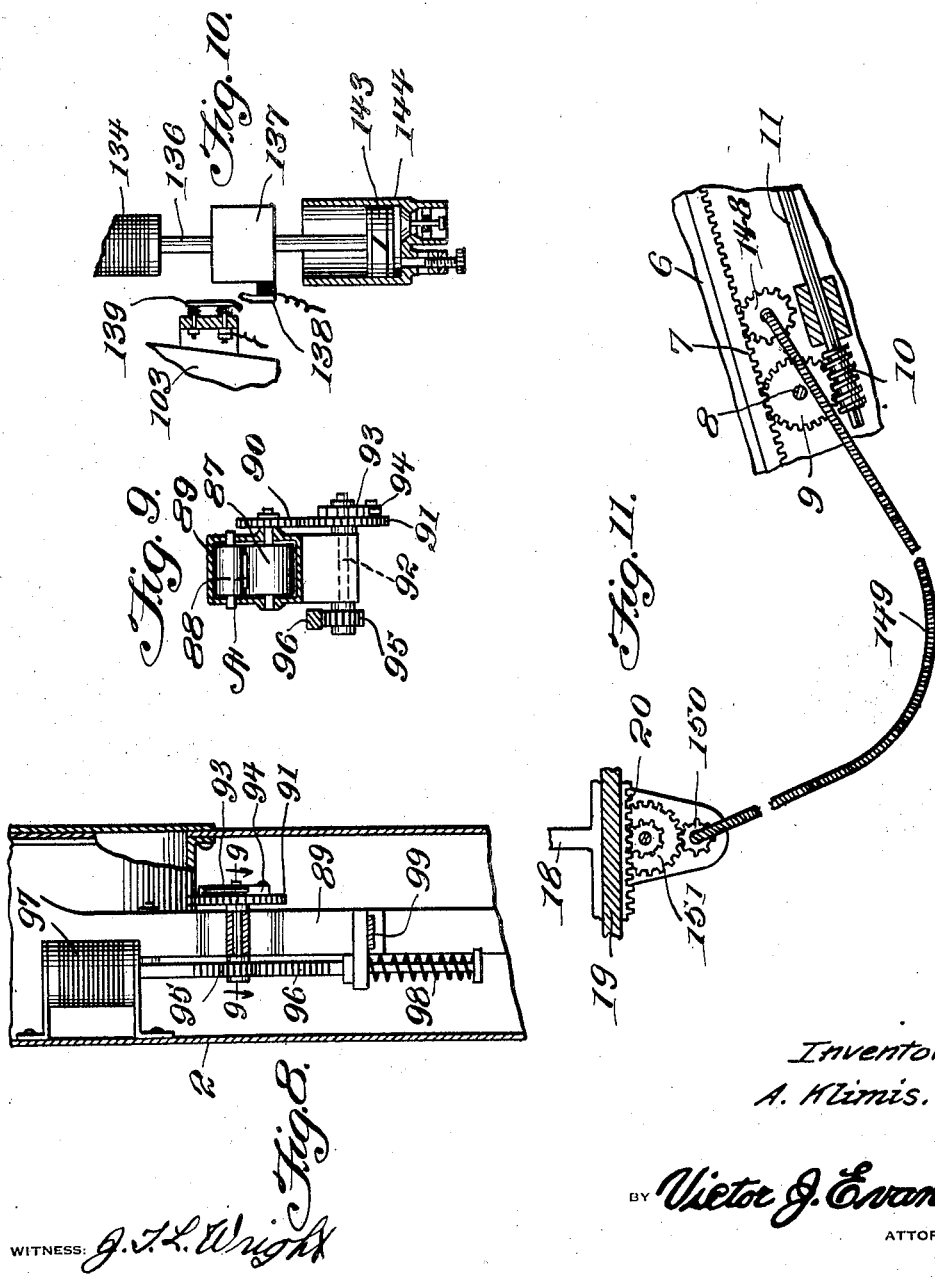

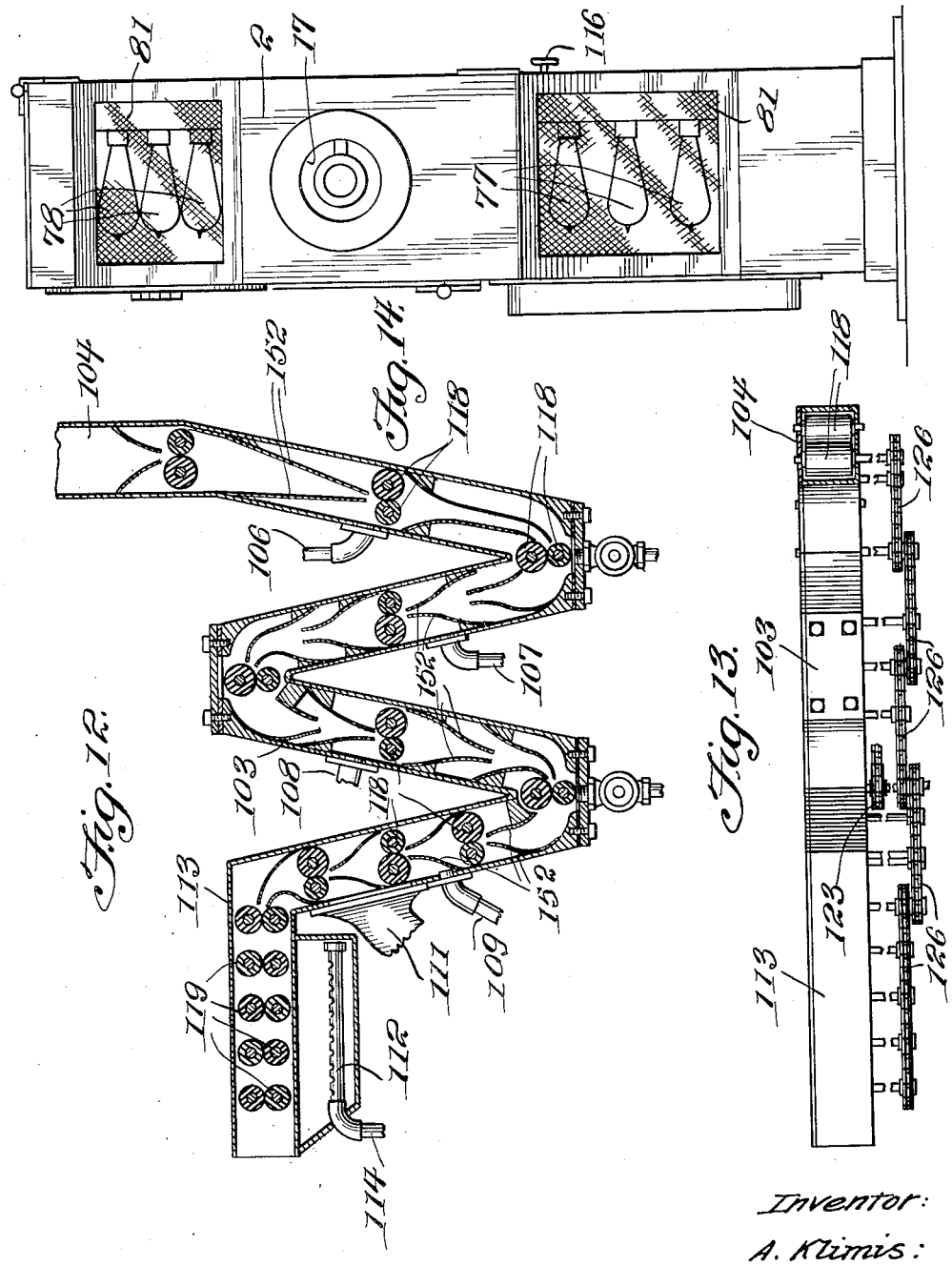

July 28, 1931. A. KLIMIS 1,816,290
AUTOMATIC PHOTOGRAPHIC APPARATUS
Filed April 27, 1928 7 Sheets-Sheet 7
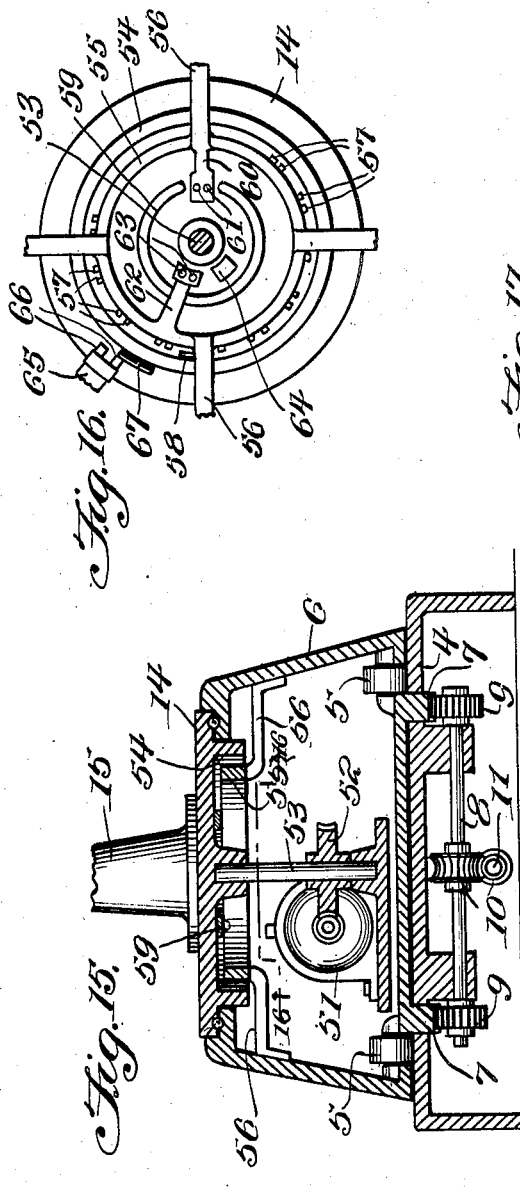
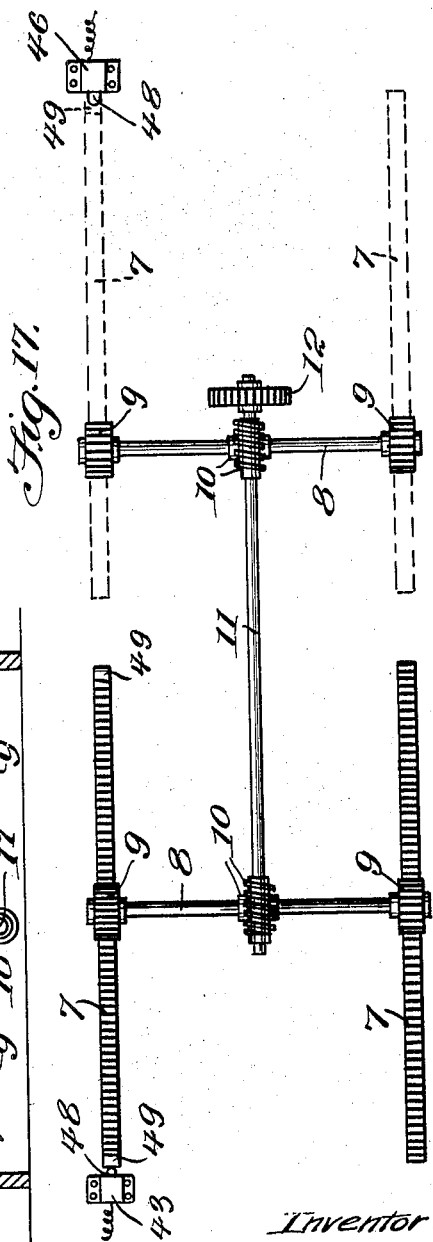
Inventor:
A. Klimis.
BY *Victor J. Evans*
ATTORNEY
WITNESS:

Patented July 28, 1931

1,816,290

UNITED STATES PATENT OFFICE

APOSTOLOS KLIMIS, OF BALTIMORE, MARYLAND, ASSIGNOR TO THE KLIMIS AUTO-PHOTOGRAPHIC MACHINE COMPANY, INCORPORATED, A CORPORATION OF MARYLAND

AUTOMATIC PHOTOGRAPHIC APPARATUS

Application filed April 27, 1928. Serial No. 273,320.

This invention relates to a photographic apparatus which is designed to take a series of photographs on a strip of sensitized material and the general object of the invention is to provide means for turning the person being photographed as the pictures are being taken so that the photographs on the strip will show the person in full face and profile and in partly profile.

Another object of the invention is to provide means whereby the means for turning the sitter will control the operation of the photographic apparatus so that the shutter of the camera will be actuated when the sitter is in certain positions and to move the strip after each operation of the shutter as well as to operate means for cutting off the exposed part of the strip and the means for passing it through the solutions for developing and washing the strip and for drying the same.

A further object of the invention is to provide a carriage for supporting the person being photographed, with means for moving the carriage toward and away from the photographic apparatus so that either a half length or full length picture may be taken, with means for automatically focussing the camera by the movement of the carriage.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention, with the cover plate removed to show the means for rotating the rolls which convey the strips through the fluids.

Figure 2 is a longitudinal vertical sectional view with parts in elevation.

Figure 3 is a diagrammatic view showing the circuits.

Figure 4 is a side view, partly in section, of a photographic apparatus.

Figure 5 is a detail view partly in section, showing the means for focussing the camera.

Figure 6 is a section on line 6—6 of Figure 5.

Figure 7 is a detail view of the front of the camera, showing the shutter operating means.

Figure 8 is a detail sectional view showing the feeding means for the sensitized strip.

Figure 9 is a section on line 9—9 of Figure 8.

Figure 10 is a detail view partly in section of the means for controlling the circuits of the motors which actuate the means for feeding the strip through the tank for the solutions and the blower.

Figure 11 is a detail view showing modified means for focussing the camera.

Figure 12 is an enlarged sectional view through the tank for the solutions and the dryer.

Figure 13 is a plan view of Figure 12.

Figure 14 is a front view of the photographic apparatus.

Figure 15 is a vertical sectional view through the carriage and its track and the means associated with these parts.

Figure 16 is a section on line 16—16 of Figure 15.

Figure 17 is a plan view of the carriage actuating means and the circuit breakers actuated by the movement of the carriage.

In these drawings, the numeral 1 indicates a base for supporting the casing 2 which contains the photographic apparatus and said base has an opening 3 therein through which passes an inclined track 4 with which the rollers 5 of a carriage 6 engage. Rack bars 7 are attached to the lower part of the carriage and a pair of shafts 8 is journaled in the base, each shaft having a toothed wheel 9 at each end thereof for engaging the teeth of the rack bars and the shafts 8 are rotated through means of the worm gearing 10, parts of which are carried by a shaft 11 which is connected by the gears 12 with the shaft of a motor 13. The shafts 8 are so arranged that the toothed wheels on one of the shafts will engage the rack bars of the carriage and act to move the carriage a certain distance when the rack bars thereon will engage the toothed wheels of the other shaft so that the movement of the carriage is completed by said other shaft.

The carriage is of substantially frusto-conical form and has a rotating platform 14 on its upper end which carries a seat 15 for the person who is to be photographed. As will be seen from Figures 1 and 2, when the carriage is in its forward position, the sitter is so positioned in relation to the camera that a half-length photograph will be taken of him, but when the carriage is moved rearwardly, it will ride up the incline so that a full length photograph will be taken of the sitter.

The camera is shown at 16 and an opening 17 is formed in the front of the casing 2 in front of the camera and the lens barrel of the camera is carried by a carriage 18 movable on a track 19 in the casing and said carriage is formed with a pair of racks 20 on its bottom which are engaged by the toothed wheels 21 carried by a shaft 22 journaled in the casing and said shaft is connected by the gears 23 with a shaft 24 journaled in the casing and having a toothed wheel 25 thereon which engages a rack bar 26 slidably supported in the casing and which is reciprocated through means of the solenoids 27 and 28, the armatures of which are connected with the rack bar, one at each end thereof. A dash-pot 29 has its piston 30 connected with the rack bar and this dash-pot insures an even and slow movement of the rack bar under the action of the solenoids.

Conductors a and b are connected with the battery B or other source of supply and conductors 31 and 32 lead from these conductors to a double switch 33 arranged under the track with its handle 34 projecting through a slot 35 formed in a part of the base 1 so that the switch can be moved to either one of its two positions by operating said handle. This switch is adapted to engage any two of the contacts 36, 37 and 38. A conductor 39 connects the central contact 37 with the motor 13 which is a reversing one, and contact 36 is connected by a conductor 40 with the solenoid 27, while contact 38 is connected by a conductor 41 with the solenoid 28.

The solenoid 27 is connected by a conductor 42 with the circuit breaker 43 which is in turn connected to the opposite side of the motor 13 by a conductor 44 and the solenoid 28 is connected by the conductor 45 with a circuit breaker 46 which in turn is connected with the motor 13 by the conductor 47. The arms 48 of the circuit breakers are adapted to be engaged by projections 49 on one of the rack bars 7 of the carriage so that each circuit breaker will be moved to circuit breaking position when the carriage reaches the limit of its movement in one direction or the other.

Thus it will be seen that when the carriage is in its lowered or forward position, circuit breaker 43 will be in inoperative positon as it will be moved off of its contact and against the action of its spring 50 by the rack bar 70 on the carriage engaging the arm 48 thereof so that no current will flow to the motor 13, but when it is desired to move the carriage rearwardly to take a full length picture, the handle 34 is moved to the "full" position, which will cause the switch to move from the position shown in Figure 3, into engagement with the contacts 37 and 38 which will cause current to flow through conductor 31 through the switch to conductor 39, through the motor and return over conductor 47, circuit breaker 46, conductor 45, through solenoid 28, over conductor 41 to the contact 38, through the switch and back to the supply over conductor 32. This will cause the motor 13 to move the carriage rearwardly and as current is being supplied to the solenoid 28, this solenoid will move the rack bar 26 so that the camera will be focused for the long range picture.

As soon as the carriage reaches its rearward limit of movement, the part 29 will strike the arm of the circuit breaker 46 and thus break the circuit to the motor as well as to the solenoid 28 so that the carriage will come to rest at the rear end of the track and the camera will be properly focussed on the sitter for a full length picture. As soon as the carriage starts to move rearwardly, the circuit breaker 43 will be closed so that the parts will be set for again moving the carriage inwardly and for re-focussing the camera when the switch 33 is moved to its other position for a half length picture.

The platform 14 is rotated through means of a motor 51, the shaft of which is connected by the gears 52 to a vertically arranged shaft 53 journaled in the carriage and having its upper end connected with the platform. The platform is provided with a depending flange 54 and a ring 55 is supported by the arms 56 from the carriage in spaced relation to the flange 54, the ring being placed in the space formed by the flange. The ring 55 carries a plurality of pair of contacts 57 and the flange 54 carries a wiper 58 which will bridge the contacts of each pair during the rotation of the platform. A wiper member 59 is carried by the under face of the platform, this member being of ring shape with its ends separated and an arm 60 is connected with one of the arms 56 and carries a pair of insulated contacts 61 which are adapted to be bridged by the member 59 during the rotation of the platform. When the platform is in normal position, however, the contacts 61 extend into the space between the ends of the member 59 so that the circuit is broken between the contacts.

A similar arm 62 is connected with the ring 55 and carries the contacts 63 which are adapted to be bridged by the wiper 64 on the platform, this wiper being of small size so that it will bridge the contacts 63 but a short time once every revolution of the platform. A member 65 is supported in the casing and carries a pair of contacts 66 which are adapted to be bridged by a wiper 67 on the outer circumference of the flange 54, this wiper also being of small size so that it will bridge the contacts 66 but for a short time once every revolution of the platform. The wiper 64 will come into engagement with the contacts 63 before the wiper 67 comes into engagement with its contacts 66.

The motor 51 is electrically connected with the conductor 32 and with a conductor 68 in which is placed a lamp 69 and a coin operated switch 70, the contact 71 of which is connected by the conductor 72 with the line $a$. The switch 70 is provided with an adjustable weight 73 and a part of this switch extends into the coin chute 74. The chute carries the support for the switch and its contact 71 and said chute is arranged at the rear part of the carriage in back of the seat with the lamp 69 arranged at the top thereof, as clearly shown in Figures 1 and 2. A drawer 74' is placed below the chute to receive the coins passing therefrom.

Thus after the motor 13 has been operated to move the carriage to the desired position, a coin is dropped into the chute and as the coin passes through the chute, it will operate the switch 70 so that said switch will engage the contact 71, thereby causing current to flow through conductor 72, contact 71, switch 70, contact 68, through the motor 51 and return over conductor 32 and as the lamp 69 is arranged in the circuit, this lamp will be lighted to indicate that the coin has properly operated the switch. The operation of the motor will cause the platform to rotate and the switch 70 remains closed long enough to cause the motor to move the platform to a point where the brush 59 will bridge the contacts 61 and as one of these contacts is connected by the conductors 75 with the conductor 31 and the other contact is connected by the conductor 76 with the motor 51, the motor 51 will continue in operation until the platform has made a complete revolution, when the brush 59 will free the contacts 61, which will break the circuit to the motor 51 and the same will come to rest. Two sets of lamps 77 and 78 are arranged in the circuit 76 so that these lamps will be lighted while the platform is being turned.

As shown in Figures 1, 2 and 4, the lamps 77 are arranged in a reflector casing 79 and the lamps 78 in a reflector casing 80, these reflector casings being arranged one above and one below the camera and are so set as to direct the rays of light against a person sitting on the seat 15. The front of each reflector casing may be covered by a sheet 81 of material which will act to soften the rays of light. These reflector casings are arranged in the front of the casing 2 which is provided with openings through which the rays of light from the lamps pass.

The shutter of the camera is normally held closed by a spring 81 having one end connected with a part of the carriage 18 and its end connected to an arm 82 of the shutter and a solenoid 83 has its core connected by a rod 84 to said arm, the solenoid being carried by an upwardly extending portion 85 of the carriage so that when the solenoid is energized, the rod 84 will move upwardly and thus open the shutter.

The strip A of sensitized material is carried by a reel 86 rotatably supported in the upper part of the casing 2 and said strip is fed in a step by step movement through the rear part of the camera by the roll 87 and the idle roll 88 which are suitably journaled in a chute 89 through which the strip passes from the reel to the camera. It is understood that the strip passes between the two rolls and the roll 87 has a gear 90 on one of its pintles which projects from the sheet. This gear meshes with a gear 91 which is loosely mounted on a shaft 92 suitably supported in the casing 2 and a ratchet wheel 93 is fastened to the shaft adjacent the gear 91 and said gear carries a pawl 94 for engaging the ratchet so that the gears will only be rotated when the shaft is moving in one direction. A pinion 95 is fastened to the opposite end of the shaft 92 and engages a rack bar 96 which has its upper end connected to the core of a solenoid 87 while its lower end is engaged by a spring 98 which tends to hold the rack bar in lowered position, but when the solenoid is energized, the rack bar is raised so that the shaft 92 will be rotated, which movement is communicated to the gears through the rack means before described and thus the roll 87 will be given a turning movement to feed the strip downwardly through the camera.

As soon as the circuit is broken to the solenoid, the spring returns the rack bar and parts associated therewith to their normal positions ready for the next operation of giving the strip another feeding movement through the camera. A spring pressed cutting member 99 is suitably supported in the casing for cutting the strip after a certain number of exposures has been made on a portion thereof and this cutting member is operated by a cam 100 normally held in inoperative position by a spring 101 and which is moved to operative position by a solenoid 102, the core of which is connected with the lower part of the cam member.

A tank 103, of substantially W-shape, has its front limb connected to an extension 104 of the chute 89 so that the severed portion of the strip cut by the cutting member will pass into this front part of the tank. This front part or limb of the tank is supplied with developing fluid from a tank 105 supported in the casing 2 by a pipe 106 and a discharge pipe 107 for this fluid is connected with the next limb of the tank 103 adjacent its center. The third limb of the tank is supplied with water by a pipe 108 which is connected with a suitable supply and this water is drained from the fourth limb of the tank by a pipe 109 which is connected with said limb adjacent its center. Air is supplied to the upper portion of the fourth limb of the tank from a blower 110 by a pipe 111 which has a flaring outlet connected with said limb.

A burner 112 is placed under a horizontal portion 113 which is connected with the upper end of the fourth limb of the tank and the outer end of this horizontal portion opens out through the rear of the casing 2. Gas or the like is supplied to the burner from a suitable source of supply through the pipe 114 which is supplied with a valve 115, the handle of which extends through the casing and the pipe 106 is provided with a valve 116, the handle of which extends through the casing. A motor 117 has its shaft geared with the shaft of the blower 110 and a plurality of pairs of rolls 118 are arranged in the tank 103 and a plurality of rolls 119, also arranged in pairs, are located in the horizontal part 113. One roll of each pair of the rolls 118 and 119 is an idle roll and the other roll of each pair is a driven roll. These rolls are driven from a motor 120 which drives a shaft 121 through the worm gearing 122 and this shaft drives the driven roller in the tank 103 which is located at the junction of the third and fourth limbs of the tank by the means shown generally at 123. The pintles of the driven rollers extend into a chamber 124 arranged at one side of the casing 2 and covered by a plate 125. Each of these pintles carries a pulley or sprocket and a plurality of belts or chains 126 are so connected with the pulleys or sprockets that all of the driven rolls will be driven from the roll which is rotated by the motor, as shown in Figure 1. It will, of course, be understood that the pairs of rolls revolve in a direction to feed the severed strip through the tank and through the part 113 to the opening at the rear of the casing, where it is deposited upon a shelf 127.

Thus it will be seen that the strip, after passing through the camera and receiving a number of exposures thereon, is deposited into the tank in the front part of which it is immersed into the developing fluid and then the strip is fed by the rolls into the rear part of the tank where it is washed by the water therein and then the strip is partly dried by the air blast from the blower and then the strip passes into the horizontal part 113 where it is fully dried by the heat from the burner and then the finished strip passes through the opening upon the shelf 127.

Conductors 128 connect the conductor 75', which is connected with one of the conductors 75 and with one of the contacts 63 on the arm 62, with one contact of each of the pairs of contacts 57 and a conductor 129 connects the other contact of every other pair of contacts 57 with the solenoid 83, said solenoid being connected with the line b by the conductor 130. The second contact of each of the other pairs of contacts 57, is connected by the conductor 131 with the solenoid 97 which feeds the film through the camera and a conductor 132 connects this solenoid with the line b. Thus during the first part of the rotary movement of the platform, the brush 58 thereon will bridge the pair of contacts 57 which face the casing 2 when the platform is at rest, so that current will pass over the conductors 31, 75 and 128, through one of the contacts 57, the brush 56, to the other contact, then over conductor 129, through solenoid 83, conductor 130 to line b, thus causing the solenoid 83 to operate the shutter to make the first exposure.

Then as the brush 56 leaves the contacts just mentioned, it will bridge the next pair of contacts and then current will pass over conductors 31, 75 and 128, through the contacts 57 of this pair and then over conductor 131 to solenoid 97 which is connected with the line b. Thus solenoid 97 will be caused to actuate the strip feeding means to bring another portion of the strip in the camera so that when the brush 56 engages the third pair of contacts 57, the shutter will be opened to expose this portion of the strip. This action will be repeated until the platform has made a complete revolution, which will cause five exposures to be made of the sitter. Of course, more or less exposures can be made by properly arranging the contacts. As shown in the drawings, no exposure will be made when the platform has moved the sitter to a point where his back is toward the camera.

A little before the platform has completed its revolution, the brush 64 will bridge the contacts 63 so that current will flow over the conductors 31, 75 and 75' to one of the contacts 63 and from this contact, the current will pass over brush 64 to the other contact 63 and then over conductor 133 to a solenoid 134 which is connected by a conductor 135 to the line b. This solenoid has a rod 136 connected with its core which is formed with an enlargement 137 which carries a contact 138 which will engage a contact 139 when the solenoid is energized, which completes the circuits to the motors 110 and 120 through the conductors 140, 141 and 142, the conductor 142 being connected with the feed line a and the conductor 140 being connected with the conductor 135 which is connected with the line $b$.

A piston 143 is connected with the lower end of the rod 136 and works in a cylinder 144, this cylinder and piston forming a dashpot for retarding the downward movement of the parts and thus holding the contact 138 against the contact 139 for quite a while. Thus the motor 117 will operate to work the blower and the motor 120 will also operate to actuate the feeding rolls in the tank and heater before the platform finishes its revolution. Soon after the circuits to the motors 110 and 120 are closed, the brush 67 on the platform bridges the contacts 66 carried by the arm 65 so that current will pass over the conductor 145 through the contacts and brush and conductor 146 to the solenoid 102 and return to the line $b$ over the conductor 147. Thus the solenoid 102 will be energized to operate the strip cutter.

Instead of using electric means for focussing the camera by the movement of the carriage, I may use the mechanical means shown in Figure 11 for doing so. Such means comprises a gear 148 engaging one of the racks on the carriage and connected by a flexible shaft 149 with a gear 150 which meshes with a gear 151 on the shaft which carries the rack engaging gears for the carriage 18 for the front of the camera.

From the foregoing it will be seen that the carriage is moved into either one of its two positions according to whether the sitter wishes a half length picture or a full length picture, the carriage being moved by the manipulation of the handle 34 of the switch 33, as before described. The movement of this switch also focusses the camera, as before explained. A coin of the proper denomination is then dropped into the chute 74 to supply current to the motor 51 to start the rotation of the platform by said motor. As soon as the platform starts to rotate, its brush 59 will bridge the contacts 61 so that the motor 51 will receive current over the conductors 31, 75, contacts 61 and conductor 76 so that the motor will continue to revolve even though the coin controlled circuit is broken by the return of the lever 70 to inoperative position after the coin passes it. This circuit also lights the lamps so that the sitter is illuminated. Shortly after the platform begins to rotate, the brush 58 bridges the front pair of contacts 57 so that current will be supplied to the solenoid 83 to open the lens of the camera and then as the brush leaves the contacts, the circuit will be broken and the spring 81 closes the shutter again. Then the brush 58 bridges the next pair of contacts, which will close the circuit to the solenoid 97, so that the sensitized strip will be given a feeding movement to bring an unexposed portion in the camera. Then the next pair of contacts is bridged by the brush 58 to again close the circuit to the solenoid 83 which opens the shutter again, the bridging of the next pair of contacts closing the circuit to the strip feeding solenoid 97 and this is kept up until the platform makes a complete revolution and five exposures of the sitter will be made. Before the revolution is completed, the brush 64 bridges the contact 63 so as to operate the circuit closing means of the motors 110 and 120 to start the air blast and the rotation of the feeding rollers in the tank and then the circuit to the solenoid 102 is closed which operates the cutter and severs that portion of the strip, which has the five exposures thereon, from the rest of the strip so that this severed portion of the strip can pass through the tank and be developed and washed and dried by the air blast and the heating means and be discharged upon the shelf as a photographic strip with five exposures thereon of the sitter in five different positions. Of course, the sitter can change his expressions during the movement of the platform and as before stated, any desired number of the exposures can be made by using the proper number of contacts.

Convergent strips 152 are placed in front of each pair of strip feeding rollers 118 to guide the strip to the rollers and to prevent curling of the strip.

As will be seen, the platform cannot be turned to close the circuit of the motor without dropping a coin in the slot, as the worm gearing between the motor and the platform will lock the parts against turning movement. As shown, the casing 2 is provided with suitable doors for providing access to the parts.

It is thought from the foregoing description that the advantages and novel features of my invention will be readily apparent.

It is to be understood that I may make changes in the construction and in the combination and arrangement of the several parts. provided that such changes fall within the scope of the appended claims.

What I claim is:—

1. In combination with a photographic apparatus including a camera, means for operating the shutter thereof, means for feeding a sensitized strip through the camera and means for treating the strip to fix the photographs thereon and dry the strip, a platform for the sitter, means for rotating the platform, and means controlled by the movement of the platform for actuating the before mentioned means of the photographic apparatus.

2. A photographic apparatus comprising a camera, magnetic means for operating the shutter thereof, means for feeding a sensitized strip step by step through the camera, magnetic means for actuating the feeding means, electric means for feeding the strip through the device, severing means for the strip after it passes through the camera, magnetic means for operating the severing means, a rotary platform for the sitter arranged in front of the camera, electric means for rotating the same and means controlled by the movement of the platform for actuating the magnetic and electric means of the photographic apparatus for taking a series of images of the sitter as the platform is being rotated.

3. A photographic apparatus comprising a camera, magnetic means for operating the shutter thereof, means for feeding a sensitized strip step by step through the camera, magnetic means for actuating the feeding means, electric means for feeding the strip through the device, severing means for the strip after it passes through the camera, magnetic means for operating the severing means, a rotary platform for the sitter arranged in front of the camera, electric means for rotating the same, means controlled by the movement of the platform for actuating the magnetic and electric means of the photographic apparatus for taking a series of images of the sitter as the platform is being rotated, a carriage on which the platform is arranged, an inclined track for the carriage, a motor for moving the carriage on the track and means controlled by the movement of the carriage for focussing the camera according to the position of the carriage.

4. A photographic apparatus comprising a casing having windows in its front, a camera in the casing in alignment with one window, lamps arranged in rear of the other windows, magnetic means for operating the shutter of the camera, means for feeding a sensitized strip through the camera, magnetic means for operating the feeding means, cutting means arranged below the camera for cutting a portion of the strip after it passes through the camera, magnetic means for operating the cutting means, a platform for the sitter, means for rotating the platform, circuits for the magnetic means and means actuated by the movement of the platform for closing the said circuits whereby a series of pictures are taken of the sitter as he is moved by the platform.

5. A photographic apparatus comprising a casing having windows in its front, a camera in the casing in alignment with one window, lamps arranged in rear of the other windows, magnetic means for operating the shutter of the camera, means for feeding a sensitized strip through the camera, magnetic means for operating the feeding means, cutting means arranged below the camera for cutting a portion of the strip after it passes through the camera, magnetic means for operating the cutting means, a platform for the sitter, means for rotating the platform, circuits for the magnetic means, means actuated by the movement of the platform for closing the said circuits whereby a series of pictures are taken of the sitter as he is moved by the platform, a carriage on which the platform is mounted, an inclined track for the carriage, a motor for moving the carriage on the track and means controlled by the movement of the carriage for focussing the camera in accordance with the position of the carriage on its track.

6. A photographic apparatus comprising a casing having windows in its front, a camera in the casing in alignment with one window, lamps arranged in rear of the other windows, magnetic means for operating the shutter of the camera, means for feeding a sensitized strip through the camera, magnetic means for operating the feeding means, cutting means arranged below the camera for cutting a portion of the strip after it passes through the camera, magnetic means for operating the cutting means, a platform for the sitter, a motor for rotating the platform, circuits for the magnetic means, means actuated by the movement of the platform for closing said circuits, means for temporarily closing the circuit of the motor for the platform and means actuated by the movement of the platform for closing said motor circuit until the platform has made a complete revolution.

7. A photographic apparatus comprising a casing having windows in its front, a camera in the casing in alignment with one window, lamps arranged in rear of the other windows, magnetic means for operating the shutter of the camera, means for feeding a sensitized strip through the camera, magnetic means for operating the feeding means, cutting means arranged below the camera for cutting a portion of the strip after it passes through the camera, magnetic means for operating the cutting means, a platform for the sitter, a motor for rotating the platform, circuits for the magnetic means, means actuated by the movement of the platform for closing said circuits, means for temporarily closing the circuit of the motor for the platform, means actuated by the movement of the platform for closing said motor circuit until the platform has made a complete revolution, a carriage on which the platform is mounted, an inclined track for the carriage, a motor for moving the carriage on the track and means controlled by the movement of the carriage for focusing the camera in accordance with the position of the carriage on its track.

8. A photographic apparatus comprising a casing, a camera in the casing, a window in the casing in front of the camera, means for feeding a sensitized strip step by step through the camera, magnetic means for operating the feeding means, magnetic means for actuating the shutter of the camera, a developing device, motor actuated means for feeding the strip through said device, magnetic means for severing the strip after it passes through the camera, a motor actuated blower for drying the strip as it leaves the developing device, a rotary platform for the sitter arranged in front of the camera, a plurality of pairs of contacts, a brush on the platform for bridging each pair of contacts as the platform revolves, a circuit for the shutter operating magnet connected with alternate pairs of contacts, a circuit for the strip feeding magnet connected with the other pairs of contacts, a circuit for the strip severing magnet, a pair of contacts in said circuit, a brush on the platform for bridging said contacts to close the circuit before the platform makes a complete revolution, circuits for the motors, circuit closing means therefor including a magnet and a dash-pot, a circuit for said magnet, a pair of contacts in said circuit, a brush on the platform for bridging the contacts before the platform makes a complete revolution and means for rotating the platform.

9. A photographic apparatus comprising a casing, a camera in the casing, a window in the casing in front of the camera, means for feeding a sensitized strip step by step through the camera, magnetic means for operating the feeding means, magnetic means for actuating the shutter of the camera, a developing device, motor actuated means for feeding the strip through said device, magnetic means for severing the strip after it passes through the camera, a motor actuated blower for drying the strip as it leaves the developing device, a rotary platform for the sitter arranged in front of the camera, a plurality of pairs of contacts, a brush on the platform for bridging each pair of contacts as the platform revolves, a circuit for the shutter operating magnet connected with alternate pairs of contacts, a circuit for the strip feeding magnet connected with the other pairs of contacts, a circuit for the strip severing magnet, a pair of contacts in said circuit, a brush on the platform for bridging said contacts to close the circuit before the platform makes a complete revolution, circuits for the motors, circuit closing means therefor including a magnet and a dash-pot, a circuit for said magnet, a pair of contacts in said circuit, a brush on the platform for bridging the contacts before the platform makes a complete revolution, a motor for rotating the platform, a circuit for the motor, means for temporarily closing said circuit to start the rotation of the platform, a second circuit for the motor and means for closing the same after the platform begins to rotate.

10. A photographic apparatus comprising a casing, a camera in the casing, a window in the casing in front of the camera, means for feeding a sensitized strip step by step through the camera, magnetic means for operating the feeding means, magnetic means for actuating the shutter of the camera, a developing device, motor actuated means for feeding the strip through said device, magnetic means for severing the strip after it passes through the camera, a motor actuated blower for drying the strip as it leaves the developing device, a rotary platform for the sitter arranged in front of the camera, a plurality of pairs of contacts, a brush on the platform for bridging each pair of contacts as the platform revolves, a circuit for the shutter operating magnet connected with alternate pairs of contacts, a circuit for the strip feeding magnet connected with the other pairs of contacts, a circuit for the strip severing magnet, a pair of contacts in said circuit, a brush on the platform for bridging said contacts to close the circuit before the platform makes a complete revolution, circuits for the motors, circuit closing means therefor including a magnet and a dash-pot, a circuit for said magnet, a pair of contacts in said circuit, a brush on the platform for bridging the contacts before the platform makes a complete revolution, a motor for rotating the platform, a circuit for the motor, means for temporarily closing said circuit to start the rotation of the platform, a second circuit for the motor, means for closing the same after the platform begins to rotate, means for focussing the camera, a carriage for supporting the platform, an inclined track for the carriage, means for moving the carriage on the track and means controlled by the movement of the carriage for operating the camera focussing means.

11. A photographic apparatus comprising a casing, a camera in the casing, a window in the casing in front of the camera, means for feeding a sensitized strip step by step through the camera, magnetic means for operating the feeding means, magnetic means for actuating the shutter of the camera, a developing device, motor actuated means for feeding the strip through said device, magnetic means for severing the strip after it passes through the camera, a motor actuated blower for drying the strip as it leaves the developing device, a rotary platform for the sitter arranged in front of the camera, a plurality of pairs of contacts, a brush on the platform for bridging each pair of contacts as the platform revolves, a circuit for the shutter operating magnet connected with alternate pairs of contacts, a circuit for the strip feeding magnet connected with the other pairs of contacts, a circuit for the strip severing magnet, a pair of contacts in said circuit, a brush on the platform for bridging said contacts to close the circuit before the platform makes a complete revolution, circuits for the motors, circuit closing means therefor including a magnet and a dash-pot, a circuit for said magnet, a pair of contacts in said circuit, a brush on the platform for bridging the contacts before the platform makes a complete revolution, a motor for rotating the platform, a circuit for the motor, means for temporarily closing said circuit to start the rotation of the platform, a second circuit for the motor, means for closing the same after the platform begins to rotate, means for focussing the camera, a carriage for supporting the platform, an inclined track for the carriage, means for moving the carriage on the track, means controlled by the movement of the carriage for operating the camera focussing means, lamps for illuminating the sitter, circuits for the lamps, said circuits being connected with the circuit of the motor for rotating the platform.

In testimony whereof I affix my signature.

APOSTOLOS KLIMIS.